US011984057B2

(12) United States Patent
Choi et al.

(10) Patent No.: US 11,984,057 B2
(45) Date of Patent: May 14, 2024

(54) DISPLAY DEVICE, AND METHOD OF OPERATING A DISPLAY DEVICE

(71) Applicant: SAMSUNG DISPLAY CO., LTD., Yongin-si (KR)

(72) Inventors: Seungyoung Choi, Yongin-si (KR); Seongjun Kim, Seoul (KR); Jae Woo Ryu, Suwon-si (KR); Youngsoo Sohn, Yongin-si (KR); Kwan-Young Oh, Hanam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 113 days.

(21) Appl. No.: 17/814,129

(22) Filed: Jul. 21, 2022

(65) Prior Publication Data

US 2023/0136973 A1 May 4, 2023

(30) Foreign Application Priority Data

Nov. 2, 2021 (KR) ........................ 10-2021-0149173

(51) Int. Cl.
*G09G 3/32* (2016.01)
*G09G 3/20* (2006.01)
(Continued)

(52) U.S. Cl.
CPC ............. *G09G 3/2092* (2013.01); *G09G 3/32* (2013.01); *G09G 3/20* (2013.01); *G09G 3/3208* (2013.01);
(Continued)

(58) Field of Classification Search
CPC .......... G09G 3/20; G09G 3/2092; G09G 3/32; G09G 3/3208; G09G 3/3266; G09G 3/3275; G09G 3/3607; G09G 2310/0218; G09G 2310/0248; G09G 2310/0267; G09G 2310/0275; G09G 2310/061;
(Continued)

(56) References Cited

U.S. PATENT DOCUMENTS

2015/0243208 A1* 8/2015 Kim .................... G09G 3/3225 345/204
2016/0086532 A1* 3/2016 Keum .................... G09G 5/005 345/76

FOREIGN PATENT DOCUMENTS

KR 10-2014-0085739 7/2014
KR 10-2016-0033816 3/2016
(Continued)

*Primary Examiner* — Adam J Snyder
(74) *Attorney, Agent, or Firm* — F. Chau & Associates, LLC

(57) ABSTRACT

A display device includes a display panel, controller configured to generate a second data enable signal and second image data based on a first data enable signal and first image data, and generate an output data enable signal and output image data by performing a black data insertion operation, and data driver configured to provide data signals based on the output data enable signal and the output image data, where the controller obtains a delay time between the first data enable signal and the second data enable signal or the first image data and the second image data, determines a number of subsequent pulses of the output data enable signal during a period from one time point within a frame period to an end time point of the frame period, and adjusts a cycle of the subsequent pulses based on the delay time and the number of the subsequent pulses.

20 Claims, 19 Drawing Sheets

(51) Int. Cl.
*G09G 3/3208* (2016.01)
*G09G 3/3266* (2016.01)
*G09G 3/3275* (2016.01)
*G09G 3/36* (2006.01)

(52) U.S. Cl.
CPC ......... *G09G 3/3266* (2013.01); *G09G 3/3275* (2013.01); *G09G 3/3607* (2013.01); *G09G 2310/0218* (2013.01); *G09G 2310/0248* (2013.01); *G09G 2310/0267* (2013.01); *G09G 2310/0275* (2013.01); *G09G 2310/061* (2013.01); *G09G 2310/062* (2013.01); *G09G 2310/08* (2013.01); *G09G 2320/0233* (2013.01); *G09G 2320/0261* (2013.01); *G09G 2320/0626* (2013.01); *G09G 2320/064* (2013.01); *G09G 2320/0646* (2013.01); *G09G 2340/16* (2013.01)

(58) Field of Classification Search
CPC ......... G09G 2310/062; G09G 2310/08; G09G 2320/0233; G09G 2320/0261; G09G 2320/0626; G09G 2320/064; G09G 2320/0646; G09G 2340/16
See application file for complete search history.

(56) References Cited

FOREIGN PATENT DOCUMENTS

| | | |
|---|---|---|
| KR | 10-2032358 | 11/2018 |
| KR | 10-2019-0066338 | 6/2019 |
| KR | 10-2020-00291782 | 3/2020 |
| KR | 10-2020-0057295 | 5/2020 |

* cited by examiner

DISPLAY DEVICE, AND METHOD OF OPERATING A DISPLAY DEVICE

CROSS-REFERENCE

This application claims priority under 35 USC § 119 to Korean Patent Application No. 10-2021-0149173, filed on Nov. 2, 2021 in the Korean Intellectual Property Office (KIPO), the disclosure of which is incorporated by reference herein in its entirety.

FIELD

Embodiments of the present disclosure relate to a display device, and more particularly relate to a display device that performs a black data insertion operation or a black duty insertion operation, and a method of operating the display device.

DISCUSSION

A display device may include a display panel that includes a plurality of pixels, a scan driver that provides scan signals to the plurality of pixels, and a data driver that provides data signals to the plurality of pixels. Each pixel may store a data signal in response to a scan signal, and may display an image based on the stored data signal. However, in a case where the display device displays a moving image, image mixing might occur where the moving image in a previous frame and the moving image in a current frame may be mixed, since the stored data signals for displaying the moving image may be gradually updated in each frame period.

SUMMARY

Embodiments of the present disclosure may use a black data insertion technique, or a black duty insertion technique, to optimize a motion picture response time (MPRT). In a display device to which the black data insertion technique is applied, a black image may be displayed between adjacent image frames of a moving image.

An embodiment provides a display device capable of reducing a luminance step difference at an end time point of a frame period.

An embodiment provides a method of operating a display device capable of reducing a luminance step difference at an end time point of a frame period.

According to an embodiment, there is provided a display device including a display panel including a plurality of pixels, a controller configured to generate a second data enable signal and second image data by performing a data processing operation on first image data synchronized with a first data enable signal, and to generate an output data enable signal and output image data by performing a black data insertion operation for the second data enable signal and the second image data, and a data driver configured to provide data signals to the plurality of pixels based on the output data enable signal and the output image data. The controller obtains a delay time between at least one of the first data enable signal and the second data enable signal or the first image data and the second image data, determines a number of subsequent pulses of the output data enable signal which are to be output during a period from one time point within a frame period to an end time point of the frame period, and adjusts a cycle of the subsequent pulses of the output data enable signal based on the delay time and the number of the subsequent pulses.

In an embodiment, to perform the black data insertion operation, the controller may decrease a cycle of each pulse of the second data enable signal and a width of each line data of the second image data, may append M black insertion pulses to each N pulses of the second data enable signal to generate the output data enable signal in which a pulse set having the N pulses and the M black insertion pulses is repeated, and may append M black line data to each N line data of the second image data to generate the output image data in which a line data set having the N line data and the M black line data is repeated, where N is an integer greater than zero, and M is an integer greater than zero.

In an embodiment, the controller may adjust the cycle of the subsequent pulses of the output data enable signal such that an end time point of the pulse set coincides with the end time point of the frame period.

In an embodiment, the display device may further include a scan driver configured to provide scan signals to the plurality of pixels. In an active period of the frame period, the scan driver may sequentially provide the scan signals to N first rows of the plurality of pixels during a time corresponding to the N pulses of a first pulse set, and may substantially simultaneously provide the scan signals to N second rows of the plurality of pixels during a time corresponding to the M black insertion pulses of the first pulse set. In a vertical blank period of the frame period, the scan driver may substantially simultaneously provide the scan signals to N third rows of the plurality of pixels during a time corresponding to the M black insertion pulses of a second pulse set.

In an embodiment, the scan driver may include a plurality of active stages configured to sequentially provide the scan signals to the plurality of pixels on a row-by-row basis in the active period, and a plurality of black insertion stages configured to sequentially provide the scan signals to the plurality of pixels on a pixel row group-by-pixel row group basis in at least a portion of the active period and the vertical blank period, each pixel row group including N pixel rows. A number of the plurality of black insertion stages may be less than a number of the plurality of active stages.

In an embodiment, the controller may adjust the cycle of the subsequent pulses of the output data enable signal such that the subsequent pulses of the output data enable signal are uniformly distributed during the period from the one time point within the frame period to the end time point of the frame period.

In an embodiment, the one time point within the frame period may be a start time point of consecutive pulses of the first data enable signal for a next time period.

In an embodiment, the controller may include one or more data processing blocks configured to receive the first data enable signal and the first image data, and to output the second data enable signal and the second image data by performing the data processing operation, and a black data insertion block configured to receive the first data enable signal, to receive the second data enable signal and the second image data from the one or more data processing blocks, to output the output data enable signal and the output image data by performing the black data insertion operation, and to adjust the cycle of the subsequent pulses of the output data enable signal.

In an embodiment, the delay time between the first data enable signal and the second data enable signal may be determined as a sum of latencies of the one or more data processing blocks.

In an embodiment, the black data insertion block may obtain the delay time between the first data enable signal and the second data enable signal, may determine the number of the subsequent pulses of the output data enable signal in a current frame period based on a number of entire pulses of the output data enable signal in a previous frame period and a number of previous pulses of the output data enable signal during a period from a start time period of the current frame period to the one time point within the current frame period, and may increase the cycle of the subsequent pulses of the output data enable signal based on the delay time and the number of the subsequent pulses.

In an embodiment, the black data insertion block may use a predetermined time corresponding to a sum of latencies of the one or more data processing blocks as the delay time between the first data enable signal and the second data enable signal.

In an embodiment, the black data insertion block may obtain the delay time between the first data enable signal and the second data enable signal by counting a time from an end time point of consecutive pulses of the first data enable signal to an end time point of consecutive pulses of the second data enable signal.

In an embodiment, the black data insertion block may obtain the delay time between the first data enable signal and the second data enable signal by counting a time from a start time point of consecutive pulses of the first data enable signal to a start time point of consecutive pulses of the second data enable signal.

In an embodiment, the black data insertion block may calculate the number of the subsequent pulses of the output data enable signal in the current frame period by subtracting the number of the previous pulses in the current frame period from the number of the entire pulses in the previous frame period.

In an embodiment, the black data insertion block may calculate an unadjusted output time from the one time point to an unadjusted end time point of the subsequent pulses by multiplying the number of the subsequent pulses by a cycle of each pulse of the second data enable signal, may calculate a cycle adjustment coefficient by dividing the delay time by the unadjusted output time, and may increase the cycle of the subsequent pulses of the output data enable signal by multiplying the cycle of the subsequent pulses by the cycle adjustment coefficient.

In an embodiment, the controller may append an additional pulse set having N pulses and M black insertion pulses to the subsequent pulses, and may adjust the cycle of the subsequent pulses to which the additional pulse set is appended such that the subsequent pulses to which the additional pulse set is appended are uniformly distributed during the period from the one time point to the end time point of the frame period, where N is an integer greater than zero, and M is an integer greater than zero.

In an embodiment, the controller may determine a no-signal time from an end time point of the subsequent pulses to a start time point of a next time period, and may compare the no-signal time with a half of a pulse set time. In a case where the no-signal time is less than the half of the pulse set time, the controller may adjust the cycle of the subsequent pulses such that the subsequent pulses are uniformly distributed during the period from the one time point to the end time point of the frame period. In a case where the no-signal time is greater than or equal to the half of the pulse set time, the controller may append an additional pulse set having N pulses and M black insertion pulses to the subsequent pulses, and may adjust the cycle of the subsequent pulses to which the additional pulse set is appended such that the subsequent pulses to which the additional pulse set is appended are uniformly distributed during the period from the one time point to the end time point of the frame period, where N is an integer greater than zero, and M is an integer greater than zero.

According to an embodiment, there is provided a method of operating a display device. In the method, a second data enable signal and second image data are generated by performing a data processing operation on first image data synchronized with a first data enable signal, an output data enable signal and output image data are generated by performing a black data insertion operation for the second data enable signal and the second image data, a delay time between at least one of the first data enable signal and the second data enable signal or the first image data and the second image data is obtained, a number of subsequent pulses of the output data enable signal which are to be output during a period from one time point within a frame period to an end time point of the frame period is determined, a cycle of the subsequent pulses of the output data enable signal is adjusted based on the delay time and the number of the subsequent pulses, and a display panel is driven based on the output data enable signal and the output image data.

In an embodiment, to adjust the cycle of the subsequent pulses of the output data enable signal, an additional pulse set having N pulses and M black insertion pulses may be appended to the subsequent pulses, where N is an integer greater than zero, and M is an integer greater than zero, and the cycle of the subsequent pulses to which the additional pulse set is appended may be adjusted such that the subsequent pulses to which the additional pulse set is appended are uniformly distributed during the period from the one time point to the end time point of the frame period.

In an embodiment, to adjust the cycle of the subsequent pulses of the output data enable signal, a no-signal time from an end time point of the subsequent pulses to a start time point of a next time period may be determined, the no-signal time may be compared with a half of a pulse set time, the cycle of the subsequent pulses may be adjusted such that the subsequent pulses are uniformly distributed during the period from the one time point to the end time point of the frame period in a case where the no-signal time is less than the half of the pulse set time. In a case where the no-signal time is greater than or equal to the half of the pulse set time, an additional pulse set having N pulses and M black insertion pulses may be appended to the subsequent pulses, and the cycle of the subsequent pulses to which the additional pulse set is appended may be adjusted such that the subsequent pulses to which the additional pulse set is appended are uniformly distributed during the period from the one time point to the end time point of the frame period, where N is an integer greater than zero, and M is an integer greater than zero.

According to an embodiment, display driver configured to drive a display panel including a plurality of pixels is provided, the display driver comprising: a controller configured to generate a second data enable signal and second image data by performing a data processing operation on first image data synchronized with a first data enable signal, and to generate an output data enable signal and output image data by performing a black data insertion operation for the second data enable signal and the second image data; a scan driver including a plurality of active stages and at least one black insertion stage responsive to the controller, the plurality of active stages configured to receive at least one of a scan start signal or a scan clock signal from the controller, and the at least one black insertion stage configured to receive at least one of a black insertion start signal or a black insertion clock signal from the controller, the scan driver configured to provide scan signals to the plurality of pixels based on the at least one of the scan start signal or the scan clock signal and the at least one of the black insertion start signal or the black insertion clock signal; and a data driver configured to provide data signals to the plurality of pixels based on the output data enable signal and the output image data, wherein the controller obtains a delay time between at least one of the first data enable signal and the second data enable signal or the first image data and the second image data, determines a number of subsequent pulses of the output data enable signal which are to be output during a period from one time point within a frame period to an end time point of the frame period, and adjusts a cycle of the subsequent pulses of the output data enable signal based on the delay time and the number of the subsequent pulses.

In a display device and a method of operating the display device according to an embodiment, a delay time between a first data enable signal before a data processing operation is performed and a second data enable signal after the data processing operation is performed may be obtained, the number of subsequent pulses of an output data enable signal which are to be output during a period from one time point within a frame period to an end time point of the frame period may be determined, and a cycle or a period of the subsequent pulses of the output data enable signal may be adjusted based on the delay time and the number of the subsequent pulses. Accordingly, a no-signal time in which no pulse of the output data enable signal exists in an end portion of the frame period may be removed, and a luminance step difference at the end time point of the frame period may be reduced or prevented.

BRIEF DESCRIPTION OF THE DRAWINGS

Illustrative, non-limiting embodiments may be more clearly understood from the following detailed description when taken in conjunction with the accompanying drawings, in which.

DETAILED DESCRIPTION

Hereinafter, embodiments of the present disclosure will be explained in detail with reference to the accompanying drawings.

Figure 1:
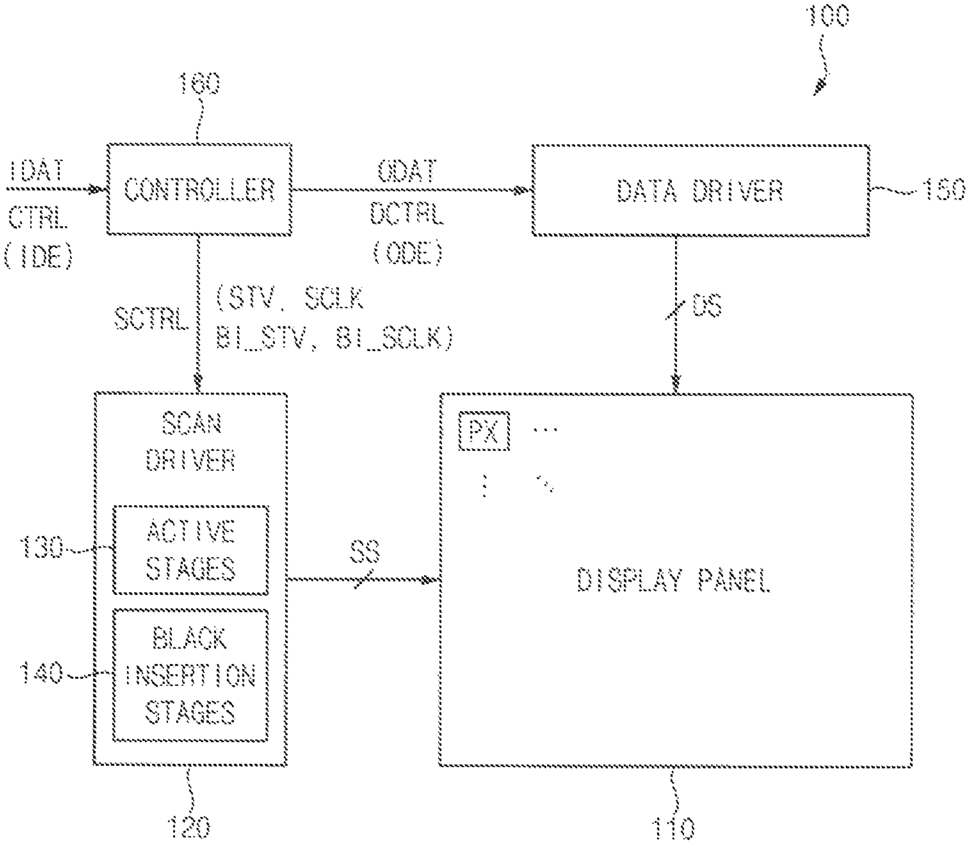
FIG. 1 is a block diagram illustrating a display device according to an embodiment.
Figure 2:
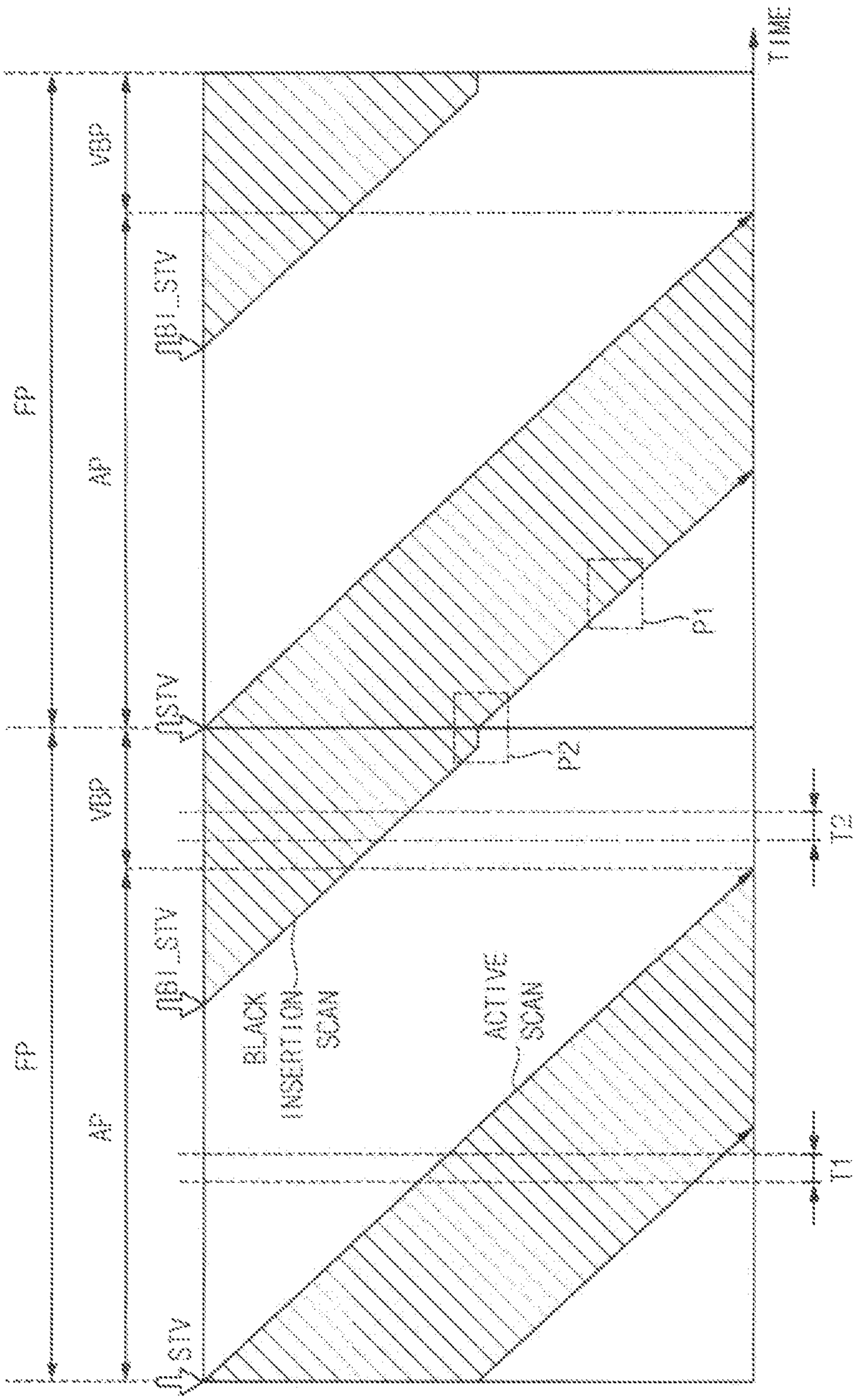
FIG. 2 is a hybrid diagram illustrating an example of a frame period for describing a black data insertion operation performed by a display device.
Figure 3:
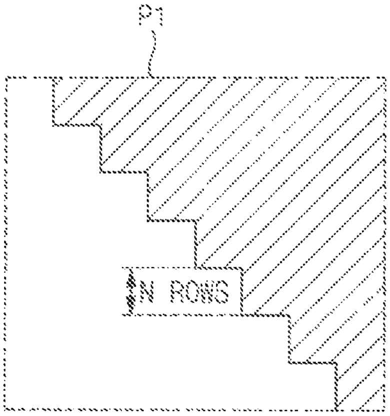
FIG. 3 is a hybrid diagram illustrating an example of a first portion of FIG. 2.
Figure 4:
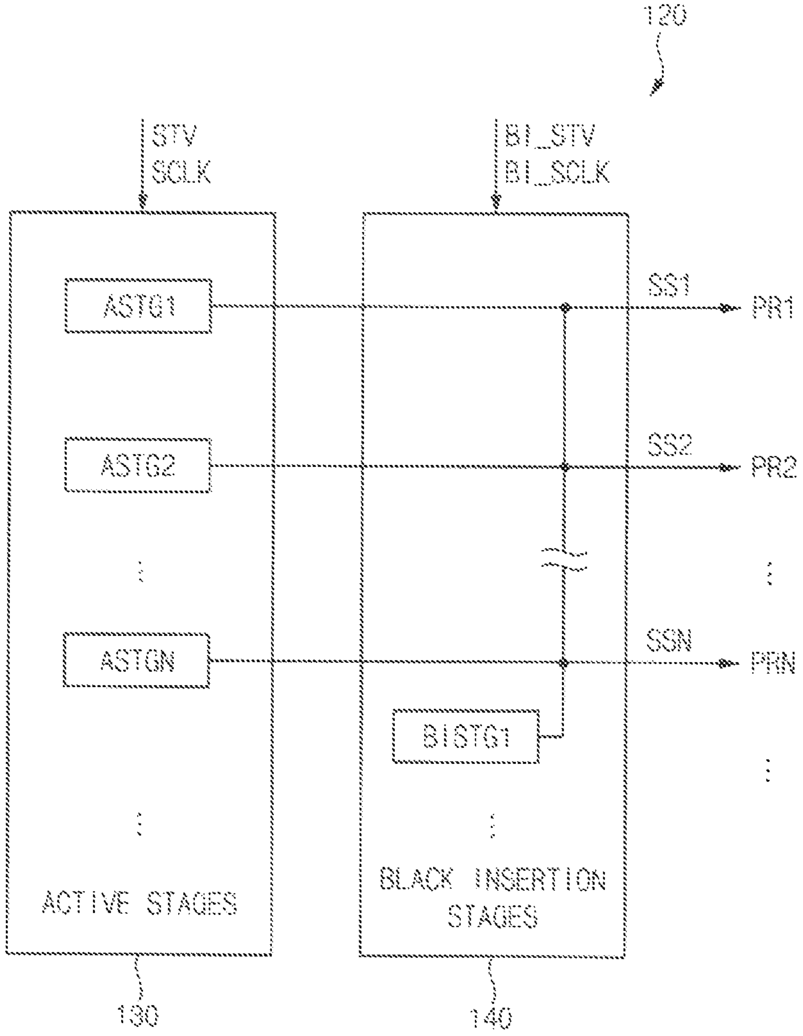
FIG. 4 is a block diagram illustrating an example of a scan driver included in a display device according to an embodiment.
Figure 5:
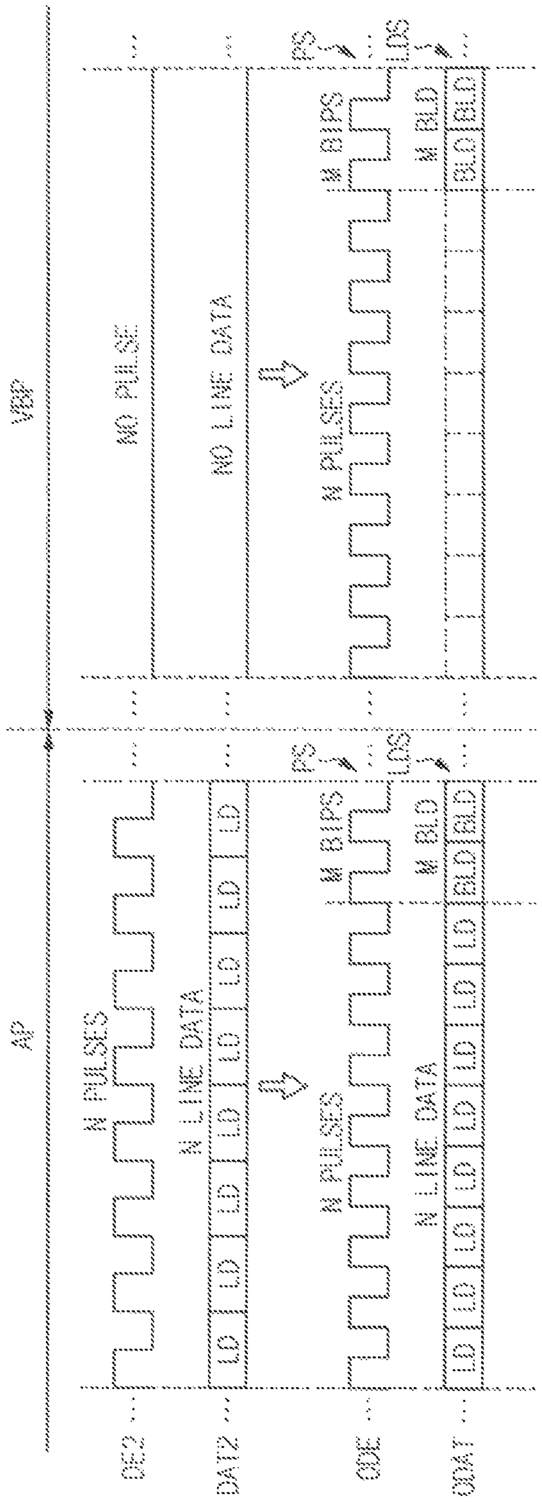
FIG. 5 is a timing diagram for describing an example of a black data insertion operation in an active period and a vertical blank period.
Figure 6:
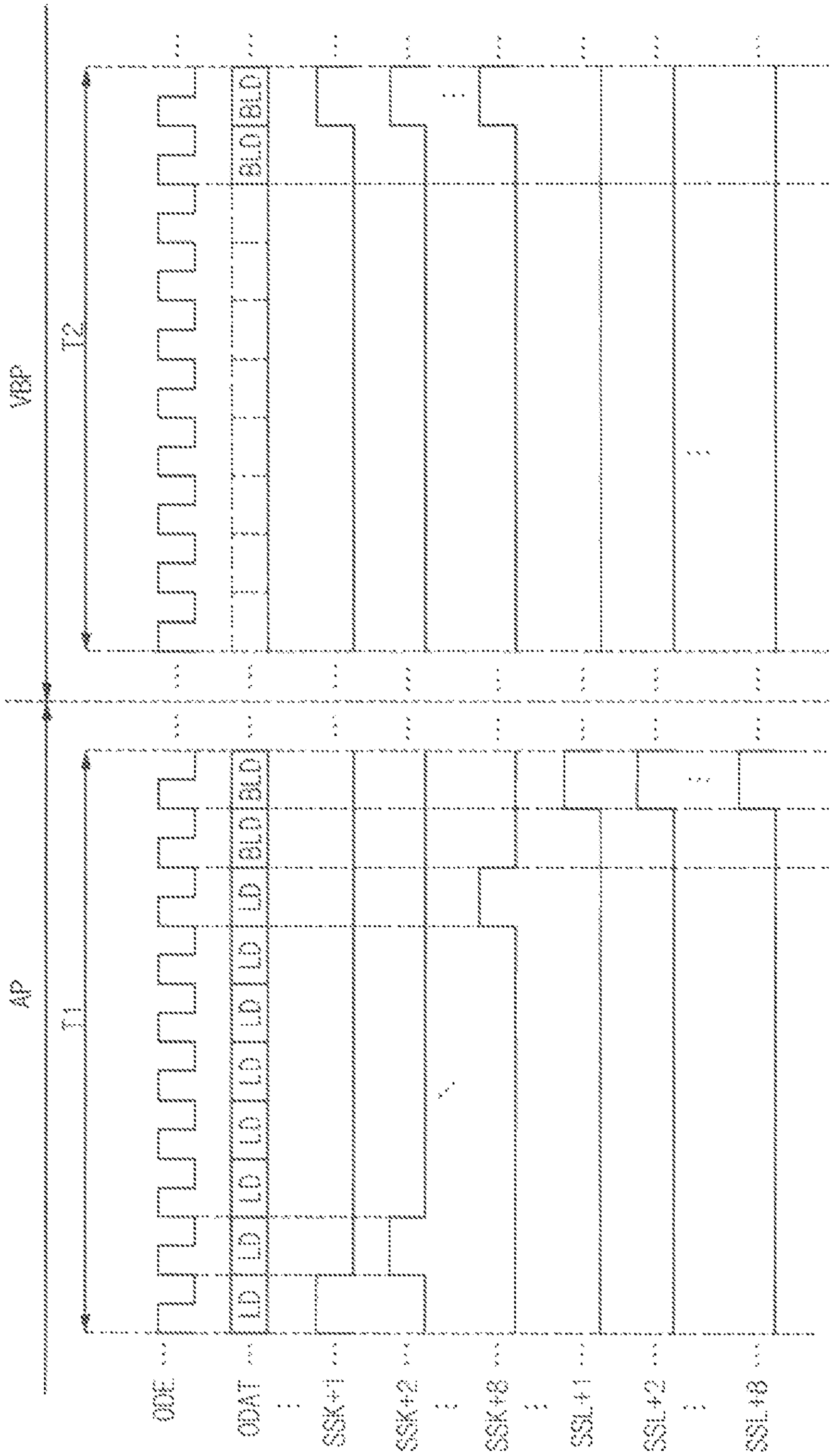
FIG. 6 is a timing diagram for describing an example of an active scan operation and a black data insertion operation in an active period and a vertical blank period.
Figure 7:
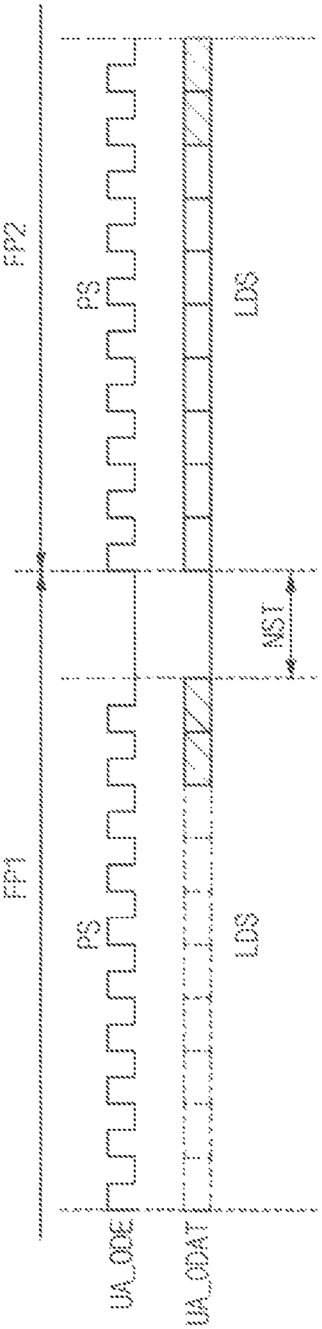
FIG. 7 is a timing diagram illustrating an example of an unadjusted output data enable signal in which a pulse period is not adjusted and unadjusted output image data synchronized with the unadjusted output data enable signal.
Figure 8A:
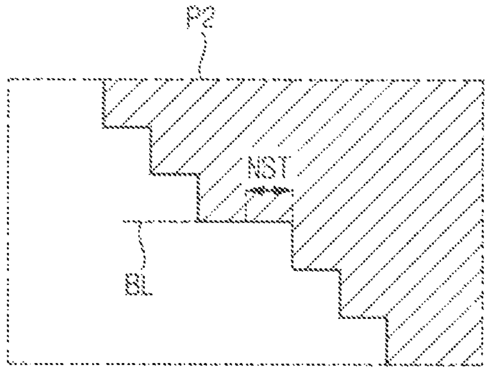
FIG. 8A is a hybrid diagram illustrating an example of a second portion of FIG. 2.
Figure 8B:
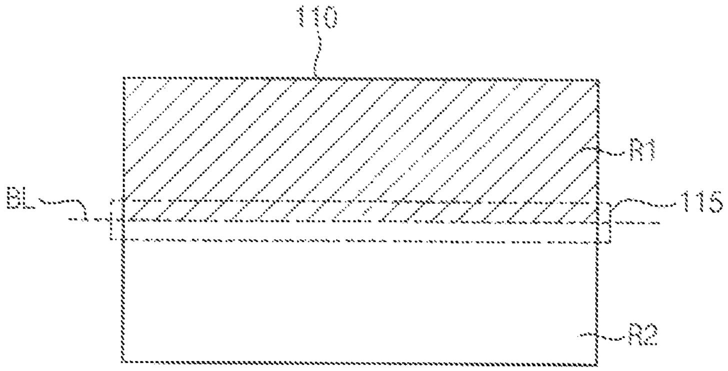
FIG. 8B is a hybrid diagram illustrating an example of luminance of a display panel in a case where a pulse width of an output data enable signal is not adjusted.
Figure 9:
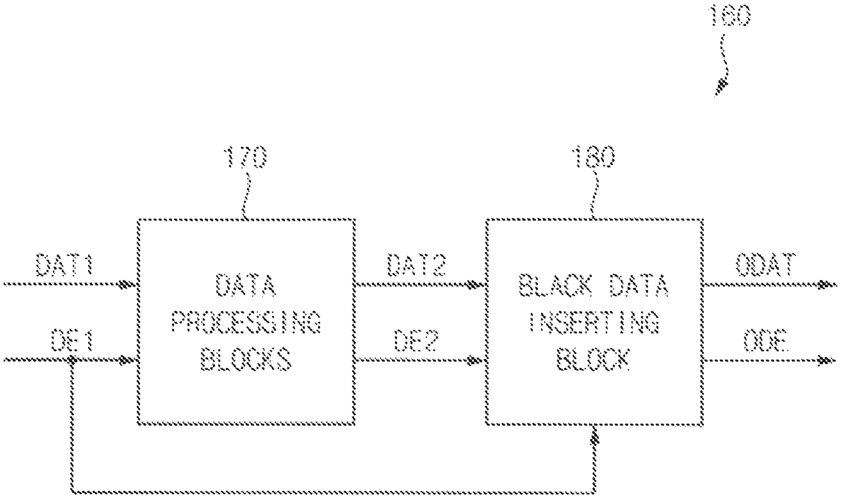
FIG. 9 is a block diagram illustrating a controller included in a display device according to an embodiment.
Figure 10:
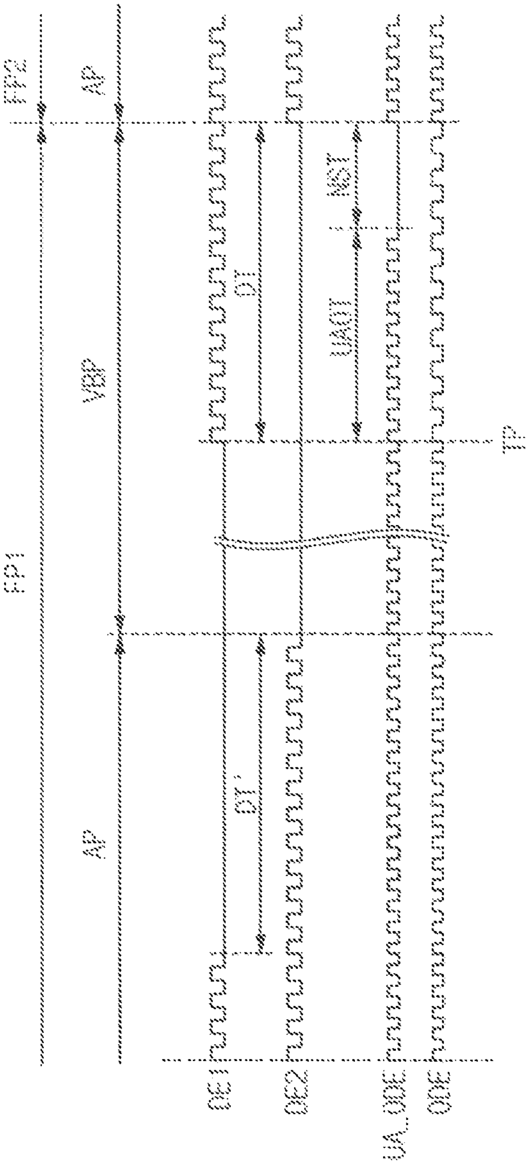
FIG. 10 is a timing diagram illustrating an example of a first data enable signal, a second data enable signal and an output data enable signal in a display device according to an embodiment.
Figure 11:
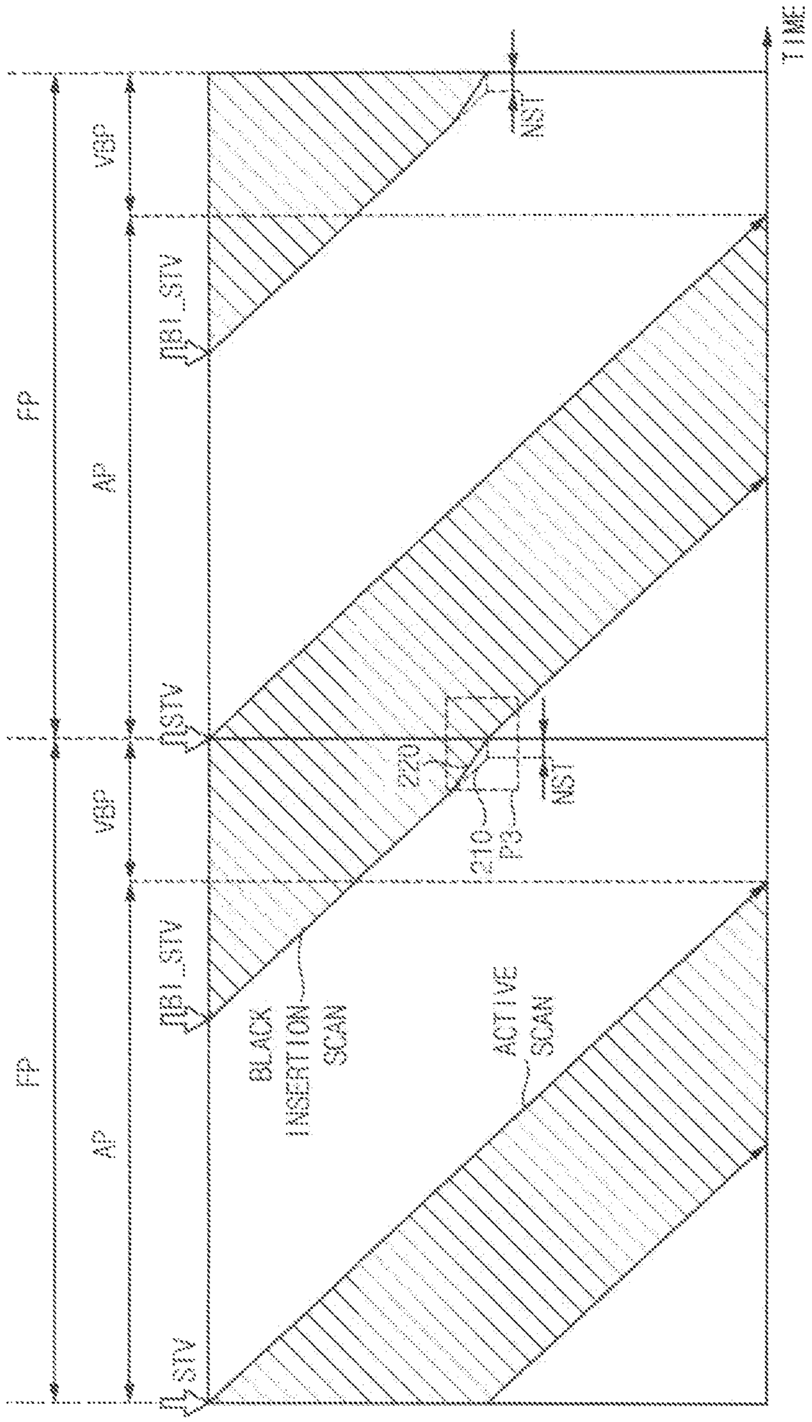
FIG. 11 is a hybrid diagram illustrating an example of a frame period in a display device according to an embodiment.
Figure 12:
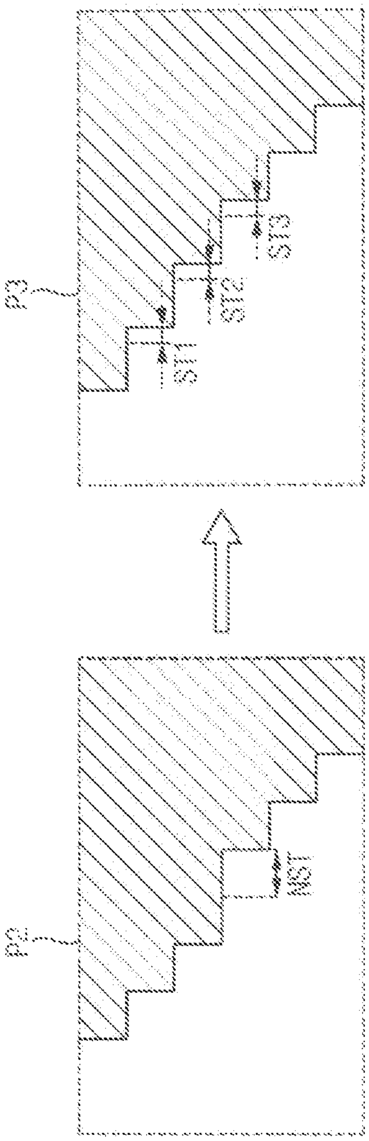
FIG. 12 is a hybrid diagram for describing an example of an operation of a display device according to an embodiment.

FIGS. 1-12 may be considered before FIGS. 13-19. FIG. 1 illustrates a display device according to an embodiment. FIG. 2 illustrates an example of a frame period for describing a black data insertion operation performed by a display device. FIG. 3 illustrates an example of a first portion of FIG. 2. FIG. 4 illustrates an example of a scan driver included in a display device according to an embodiment. FIG. 5 is used for describing an example of a black data insertion operation in an active period and a vertical blank period. FIG. 6 is used for describing an example of an active scan operation and a black data insertion operation in an active period and a vertical blank period. FIG. 7 illustrates an example of an unadjusted output data enable signal in which a pulse period is not adjusted and unadjusted output image data synchronized with the unadjusted output data enable signal. FIG. 8A illustrates an example of a second portion of FIG. 2, and FIG. 8B illustrates an example of luminance of a display panel in a case where a pulse width of an output data enable signal is not adjusted. FIG. 9 illustrates a controller included in a display device according to an embodiment. FIG. 10 illustrates an example of a first data enable signal, a second data enable signal and an output data enable signal in a display device according to an embodiment. FIG. 11 illustrates an example of a frame period in a display device according to an embodiment. FIG. 12 is used for describing an example of an operation of a display device according to an embodiment.

Referring to FIG. 1, a display device 100 according to an embodiment may include a display panel 110 that includes a plurality of pixels PX, a scan driver 120 that provides scan signals SS to the plurality of pixels PX, a data driver 150 that provides data signals DS to the plurality of pixels PX, and a controller 160 that controls the scan driver 120 and the data driver 150.

The display panel 110 may include a plurality of data lines, a plurality of scan lines, and the plurality of pixels PX coupled to the plurality of data lines and the plurality of scan lines. In an embodiment, each pixel PX may include an organic light emitting diode (OLED), and the display panel 110 may be an OLED panel. In another embodiment, the display panel 110 may be a nano light emitting diode (NED) display panel, a quantum dot (QD) light emitting diode display panel, an inorganic light emitting diode display panel, a liquid crystal display (LCD) panel, or any other suitable display panel.

The scan driver 120 may provide the scan signals SS to the plurality of pixels PX based on a scan control signal SCTRL received from the controller 160. In an embodiment, the scan driver 120 may include, without limitation, active stages 130 that sequentially provide the scan signals SS to the plurality of pixels PX, such as on a row-by-row basis, in an active period of each frame period, and black insertion stages 140 that sequentially provide the scan signals SS to the plurality of pixels PX, such as on a pixel row group by pixel row group basis, in at least a portion of the active period and a vertical blank period of each frame period. Further, in an embodiment, the scan control signal SCTRL may include, without limitation, a scan start signal STV and a scan clock signal SCLK provided to the active stages 130, and may further include, without limitation, a black insertion scan start signal BI_STV and a black insertion scan clock signal BI_SCLK provided to the black insertion stages 140. In an embodiment, the scan driver 120 may be integrated or formed in a peripheral portion of the display panel 110. In another embodiment, the scan driver 120 may be implemented with one or more integrated circuits.

The data driver 150 may provide the data signals DS to the plurality of pixels PX through the plurality of data lines based on a data control signal DCTRL and output image data ODAT received from the controller 160. The data control signal DCTRL may include an output data enable signal ODE, and the output image data ODAT may include line data for each pixel row in synchronization with the output data enable signal ODE. In an embodiment, the data control signal DCTRL may further include, without limitation, a horizontal start signal and a load signal. In an embodiment, the data driver 150 and the controller 160 may be implemented with a single integrated circuit, and the single integrated circuit may be referred to as a timing controller embedded data driver (TED) integrated circuit. In another embodiment, the data driver 150 and the controller 160 may be implemented with separate integrated circuits.

The controller 160, such as a timing controller (TCON), may receive input image data IDAT and a control signal CTRL from an external host processor, such as a graphics processing unit (GPU), an application processor (AP) or a graphics card. In an embodiment, the input image data IDAT may be RGB image data including red image data, green image data and blue image data. The control signal CTRL may include an input data enable signal IDE, and the input image data IDAT may include line data for each pixel row in synchronization with the input data enable signal IDE. In an embodiment, the control signal CTRL may include, without limitation, a vertical synchronization signal, a horizontal synchronization signal, a master clock signal, or the like. The controller 160 may generate the scan control signal SCTRL, the data control signal DCTRL and the output image data ODAT based on the control signal CTRL and the input image data IDAT. The controller 160 may control an operation of the scan driver 120 by providing the scan control signal SCTRL to the scan driver 120, and may control an operation of the data driver 150 by providing the data control signal DCTRL and the output image data ODAT to the data driver 150.

In the display device 100 according to an embodiment, the controller 160, such as in data processing blocks 170 illustrated in FIG. 9, may generate a second data enable signal such as DE2 in FIG. 9, and second image data such as DAT2 in FIG. 9, by performing a data processing operation on first image data, such as DAT1 in FIG. 9, synchronized with a first data enable signal, such as DE1 in FIG. 9. In an embodiment, the first data enable signal and the first image data may be, without limitation, the input data enable signal IDE and the input image data IDAT. In another embodiment, the first data enable signal and the first image data may be a data enable signal and image data generated by the controller 160 based on the input data enable signal IDE and the input image data IDAT. The data processing operation may be any processing operation for improving an image quality of the display device 100. For example, the data processing operation may include, without limitation, a gamma processing operation, an on screen display (OSD) processing operation, and/or a dynamic capacitance compensation (DCC) operation.

Further, the controller 160 may perform a black data insertion operation or a black duty insertion operation that inserts black line data into the second image data such that the display panel 110 may display a black image between adjacent frames. That is, the controller 160 may generate the output data enable signal ODE and the output image data ODAT by performing the black data insertion operation for the second data enable signal and the second image data, and may provide the output data enable signal ODE and the output image data ODAT to the data driver 150. Further, the controller 160 may generate the scan clock signal SCLK and the black insertion scan clock signal BI_SCLK in synchronization with the output data enable signal ODE, and may provide the scan clock signal SCLK and the black insertion scan clock signal BI_SCLK synchronized with the output data enable signal ODE to the scan driver 120.

For example, as illustrated in FIG. 2, each frame period FP may include an active period AP and a vertical blank period VBP. During the active period AP, the scan driver 120 may perform an active scan operation that sequentially provides the scan signals SS to the plurality of pixels PX on a pixel row by pixel row basis in response to the scan start signal STV, such as indicated by the first and third leftmost arrows in FIG. 11; the data driver 150 may provide the data signals DS to the plurality of pixels PX; and the plurality of pixels PX may display an image corresponding to the input image data IDAT.

Further, the controller 160 may provide the black insertion scan start signal BI_STV to the scan driver 120 at a predetermined time point, such as indicated by the second and fourth leftmost arrows in FIG. 11, within the frame period FP, and may provide the data driver 150 with the output image data ODAT in which the black line data are inserted. The scan driver 120 may perform a black insertion scan operation that sequentially provides the scan signals SS to the plurality of pixels PX, such as on a pixel row group by pixel row group basis, in response to the black insertion scan start signal BI_STV, the data driver 150 may provide the data signals DS corresponding to the black line data to the plurality of pixels PX, and the plurality of pixels PX may display a black image corresponding to the black line data.

Accordingly, a motion picture response time (MPRT) of the display device 100 may be improved.

In an embodiment, to perform the black insertion scan operation, the scan driver 120 may sequentially provide the scan signals SS to the plurality of pixels PX on a pixel row group by pixel row group basis during at least a portion of the active period AP and the vertical blank period VBP, and each pixel row group may include N pixel rows, where N is an integer greater than zero.

For example, as illustrated in FIG. 3 in which a first portion P1 of FIG. 2 is enlarged, the scan driver 120 may substantially simultaneously provide the scan signals SS to N pixel rows N ROWS, and then may substantially simultaneously provide the scan signals SS to the next N pixel rows N ROWS. In this manner, as the black insertion scan operation, the scan driver 120 may sequentially provide the scan signals SS to the plurality of pixels PX on the pixel row group by pixel row group basis.

To perform the active scan operation and the black insertion scan operation in an embodiment as illustrated in FIG. 4, the scan driver 120 may include a plurality of active stages 130 that sequentially provides the scan signals SS to the plurality of pixels PX on the row-by-row basis in the active period AP, and a plurality of black insertion stages 140 that sequentially provides the scan signals SS to the plurality of pixels PX on the pixel row group by pixel row group basis in at least a portion of the active period AP and in the vertical blank period VBP, where each pixel row group includes N pixel rows. In an embodiment, the number of the plurality of black insertion stages 140 may be less than the number of the plurality of active stages 130.

For example, as illustrated in FIG. 4, the scan driver 120 may include one black insertion stage BISTG1 per N active stages ASTG1, ASTG2, . . . , ASTGN. In this case, first through N-th active stages ASTG1 through ASTGN may provide first through N-th scan signals SS1, SS2, . . . , SSN to first through N-th pixel rows PR1, PR2, . . . , PRN, respectively, and a first black insertion stage BISTG1 may substantially simultaneously provide the first through N-th scan signals SS1 through SSN to first through N-th pixel rows PR1 through PRN.

Further, in an embodiment, to perform the black data insertion operation, the controller 160 may insert or append M black line data to each N line data of the second image data, where N and M are integers greater than zero. For example, as illustrated in FIG. 5, in the active period AP, the controller 160 may decrease a cycle of each pulse of the second data enable signal DE2 and a width of each line data LD of the second image data DAT2. For example, the controller 160 may decrease the cycle and the width to about four fifths or 80%. Further, the controller 160 may append M black insertion pulses BIPS to each N pulses of the second data enable signal DE2 to generate the output data enable signal ODE in which a pulse set PS having the N pulses and the M black insertion pulses BIPS is repeated.

For example, as illustrated in FIG. 5, the controller 160 may append two black insertion pulses BIPS to every eight pulses of the second data enable signal DE2 to generate the output data enable signal ODE in which the pulse set PS having ten pulses is repeated. Further, the controller 160 may append M black line data BLD to each N line data LD of the second image data DAT2 to generate the output image data ODAT in which a line data set LDS having the N line data LD and the M black line data BLD is repeated. For example, as illustrated in FIG. 5, the controller 160 may append two black line data BLD to every eight line data LD of the second image data DAT2 to generate the output image data ODAT in which the line data set LDS having ten line data LD and BLD is repeated. In the vertical blank period VBP, the second data enable signal DE2 may have no pulse, and the second image data DAT2 may have no line data. However, the N pulses and the M black insertion pulses BIPS may be periodically repeated in the output data enable signal ODE generated by the black data insertion operation, and the line data set LDS having the M black line data BLD synchronized with the M black insertion pulses BIPS may be repeated in the output image data ODAT generated by the black data insertion operation.

FIG. 6 illustrates an example of the active scan operation and the black insertion scan operation performed in accordance with the output data enable signal ODE and the output image data ODAT. Further, FIG. 6 illustrates the active scan operation and the black insertion scan operation during a first time T1 corresponding to a first pulse set PS within the active period AP illustrated in FIG. 2, and the black insertion scan operation during a second time T2 corresponding to a second pulse set PS within the vertical blank period VBP illustrated in FIG. 2.

Referring to FIG. 6, in the first time T1 within the active period AP, the active stages 130 of the scan driver 120 may sequentially provide N scan signals including SSK+1, SSK+2, . . . , SSK+8 to N first pixel rows during a time corresponding to the N pulses of the first pulse set PS, and the black insertion stages 140 of the scan driver 120 may substantially simultaneously provide N scan signals including SSL+1, SSL+2, . . . , SSL+8 to N second pixel rows during a time corresponding to the M black insertion pulses BIPS of the first pulse set PS. For example, as illustrated in FIG. 6, the active stages 130 may sequentially provide eight scan signals SSK+1 through SSK+8 to eight pixel rows in synchronization with eight pulses of the output data enable signal ODE, and the black insertion stages 140 may substantially simultaneously provide eight scan signals SSL+1 through SSL+8 to another eight pixel rows in synchronization with at least one of two black insertion pulses BIPS.

For example, a precharge operation that precharges the data lines may be performed in synchronization with, without limitation, a first one of the two black insertion pulses BIPS, and the black insertion stages 140 may substantially simultaneously provide the eight scan signals SSL+1 through SSL+8 to the other eight pixel rows in synchronization with, without limitation, a second one of the two black insertion pulses BIPS. Accordingly, the eight pixel rows receiving the eight scan signals SSK+1 through SSK+8 may display an image based on the eight line data LD, respectively, and the other eight pixel rows receiving the eight scan signals SSL+1 through SSL+8 may display a black image based on the same black line data BLD.

Further, during the second time T2 within the vertical blank period VBP, the active stages 130 need not perform the active scan operation, and the black insertion stages 140 may substantially simultaneously provide the N scan signals SSK+1, SSK+2, . . . , SSK+8 to the N first pixel rows during the time corresponding to the M black insertion pulses BIPS of the second pulse set PS. For example, as illustrated in FIG. 6, the black insertion stages 140 may substantially simultaneously provide the eight scan signals SSK+1 through SSK+8 to the eight pixel rows in synchronization with at least one of two black insertion pulses BIPS. Accordingly, the eight pixel rows receiving the eight scan signals SSK+1 through SSK+8 may display a black image based on the same black line data BLD.

However, since the black data insertion operation is performed in a unit of the pulse set PS, or in a unit of the line data set LDS synchronized with the pulse set PS, in a case where a pulse cycle or a pulse period of the pulse set PS is not adjusted, a no-signal time in which the output data enable signal ODE has no pulse may exist in an end portion of each frame period. For example, as illustrated in FIG. 7, in a case where an end point of a first frame period FP1 does not coincide with an end time point of the pulse set PS or an end time point of the line data set LDS, the no-signal time NST in which an unadjusted output data enable signal UA_ODE has no pulse and unadjusted output image data UA_ODAT have no line data may exist in the end portion of the first frame period FP1 directly before a second frame period FP2.

In a case where the no-signal time NST exists in the end portion of the frame period FP1, as illustrated in FIG. 8A in which a second portion P2 of FIG. 2 is enlarged, pixel rows located above a boundary line BL and receiving the black line data BLD before the no-signal time NST and pixel rows located below the boundary line BL and receiving the black line data BLD after the no-signal time NST may have different black duty cycles. Thus, a time during which the pixel rows above the boundary line BL display a black image in each frame period FP1 may be longer than a time during which the pixel rows below the boundary line BL display the black image in each frame period FP1.

In this case, as illustrated in FIG. 8B, luminance of a first region R1 of the display panel 110 above the boundary line BL may be lower than luminance of a second region R2 of the display panel 110 below the boundary line BL. In particular, a luminance step difference may be viewed or perceived by a user in a region 115 of the display panel 110 including the boundary line BL.

To reduce the luminance step difference, in the display device 100 according to an embodiment, the controller 160 may obtain a delay time between the first data enable signal, such as DE1 in FIG. 9, and the second data enable signal, such as DE2 in FIG. 9, may determine the number of subsequent pulses of the output data enable signal ODE which are to be output during a period from one time point within a frame period FP1 to an end time point of the frame period FP1, and may adjust a cycle or a period of the subsequent pulses of the output data enable signal ODE based on the delay time and the number of the subsequent pulses. Further, the controller 160 may adjust a width of each line data LD and BLD of the output image data ODAT in synchronization with the adjusted cycle of the subsequent pulses. In an embodiment, as illustrated in FIG. 10, the one time point TP within the frame period FP1 may be a start time point of consecutive pulses of the first data enable signal DE1 for a next time period FP2.

In an embodiment, the controller 160 may adjust the cycle of the subsequent pulses of the output data enable signal ODE such that the end time point of the pulse set PS, or the end time point of the line data set LDS, coincides with the end time point of the frame period FP1. Accordingly, the subsequent pulses of the output data enable signal ODE may be uniformly distributed during the period from the one time point within the frame period FP1 to the end time point of the frame period FP1, the no-signal time NST in the end portion of the frame period FP1 may be removed, and thus the luminance step difference caused by the no-signal time NST may be reduced or prevented. To perform these operations, as illustrated in FIG. 9, the controller 160 may include one or more data processing blocks 170 and a black data insertion block 180.

The one or more data processing blocks 170 may receive the first data enable signal DE1 and the first image data DAT1. According to an embodiment, the first data enable signal DE1 and the first image data DAT1 may be the input data enable signal IDE and the input image data IDAT, or may be a data enable signal and image data received from other blocks within the controller 160. The one or more data processing blocks 170 may generate the second data enable signal DE2 and the second image data DAT2 by performing the data processing operation for the first image data DAT1 synchronized with the first data enable signal DE1. In an embodiment, the one or more data processing blocks 170 may include, without limitation, a gamma processing block, an OSD processing block, a DCC block, or the like.

The second data enable signal DE2 and the second image data DAT2 generated by the one or more data processing blocks 170 may be delayed by a predetermined delay time from the first data enable signal DE1 and the first image data DAT1, respectively. In an embodiment, the delay time between the first data enable signal DE1 and the second data enable signal DE2 may be determined as a sum of latencies of the one or more data processing blocks 170.

The black data insertion block 180 may receive the first data enable signal DE1, may receive the second data enable signal DE2 and the second image data DAT2 from the one or more data processing blocks 170, may output the output data enable signal ODE and the output image data ODAT by performing the black data insertion operation for the second data enable signal DE2 and the second image data DAT2, may adjust the cycle of the subsequent pulses of the output data enable signal ODE, and may adjust the width of each line data LD and BLD of the output image data ODAT in synchronization with the adjusted cycle of the subsequent pulses.

To adjust the cycle of the subsequent pulses, the black data insertion block 180 may obtain the delay time between the first data enable signal DE1 and the second data enable signal DE2, may determine the number of the subsequent pulses of the output data enable signal ODE in a current frame period FP1 based on the number of entire pulses of the output data enable signal ODE in a previous frame period and the number of previous pulses of the output data enable signal ODE during a period from a start time period of the current frame period FP1 to the one time point within the current frame period FP1, and may increase the cycle of the subsequent pulses of the output data enable signal ODE based on the delay time and the number of the subsequent pulses.

For example, as illustrated in FIG. 10, the black data insertion block 180 may obtain the delay time DT between the first data enable signal DE1 and the second data enable signal DE2. In an embodiment, the black data insertion block 180 may store a predetermined time corresponding to the sum of the latencies of the one or more data processing blocks 170, and may use the stored time as the delay time DT between the first data enable signal DE1 and the second data enable signal DE2. In another embodiment, the black data insertion block 180 may obtain the delay time DT between the first data enable signal DE1 and the second data enable signal DE2 by counting a time DT' from an end time point of consecutive pulses of the first data enable signal DE1 to an end time point of consecutive pulses of the second data enable signal DE2 in the current frame period FP1. In still another embodiment, the black data insertion block 180 may obtain the delay time DT between the first data enable signal DE1 and the second data enable signal DE2 by counting a time DT" from a start time point of the consecutive pulses of the first data enable signal DE1 to a start time point of the consecutive pulses of the second data enable signal DE2 in a previous frame period.

At the one time point TP within the current frame period FP1, or at the start time point TP of the consecutive pulses of the first data enable signal DE1 for the next frame period FP2, the black data insertion block 180 may calculate the number of the subsequent pulses of the output data enable signal ODE in the current frame period FP1 by subtracting the number of the previous pulses of the output data enable signal ODE in the current frame period FP1 from the number of the entire pulses of the output data enable signal ODE in the previous frame period. Further, the black data insertion block 180 may calculate an unadjusted output time UAOT from the one time point TP to an unadjusted end time point of the subsequent pulses by multiplying the number of the subsequent pulses by a cycle period of each pulse of the second data enable signal DE2 or the first data enable signal DE1.

The black data insertion block 180 may calculate a cycle adjustment coefficient by dividing the delay time DT by the unadjusted output time UAOT. That is, to calculate the cycle adjustment coefficient, the black data insertion block 180 may divide the delay time DT by the unadjusted output time UAOT corresponding to the no-signal time NST subtracted from the delay time DT. Thus, the cycle adjustment coefficient may be greater than 1.

The black insertion block 180 may increase the cycle of the subsequent pulses of the output data enable signal ODE by multiplying the cycle of the subsequent pulses by the cycle adjustment coefficient. That is, the black data insertion block 180 may increase the cycle of the subsequent pulses to "the delay time DT divided by the unadjusted output time UAOT" times. Accordingly, the subsequent pulses of the output data enable signal ODE may be uniformly distributed during the period from the one time point TP to the end time point of the current frame period FP1, the no-signal time NST in the end portion of the current frame period FP1 may be removed, and thus the luminance step difference caused by the no-signal time NST may be reduced or prevented.

For example, as illustrated in FIG. 11, in a case where the cycle of the subsequent pulses of the output data enable signal ODE is not adjusted, or in a case where the black insertion scan operation is performed in synchronization with the unadjusted output data enable signal UA_ODE, as illustrated as a graph 210 in FIG. 11, the black insertion scan operation may be stopped during the no-signal time NST, and the luminance step difference may occur in the display panel 110. However, in the display device 100 according to an embodiment, the black data insertion block 180 may increase the cycle of the subsequent pulses during the period from the one time point TP to the end time point of the frame period FP. Accordingly, as illustrated in a subgraph 220 of FIG. 11, the black insertion scan operation need not be stopped, the luminance of the display panel 110 may be gradually changed, and the luminance step difference may be reduced or prevented in the display panel 110.

In the display device 100 according to an embodiment, as illustrated in FIG. 12, unlike the second portion P2 of FIG. 2 in which the black insertion scan operation is stopped during the no-signal time NST, the no-signal time NST may be distributed to a plurality of pixel row groups as illustrated as a third portion P3 in FIG. 12. For example, as illustrated in FIG. 12, the no-signal time NST may be divided into first, second and third partial times ST1, ST2 and ST3, and the first, second and third partial times ST1, ST2 and ST3 may be respectively allocated to first, second and third pixel row groups. Accordingly, since the black insertion scan operation may be stopped for each partial time ST1, ST2 and ST3 considerably shorter than the no-signal time NST with respect to each pixel row group, a sharp luminance change may be prevented in the display panel 110, and the luminance step difference may be reduced or prevented in the display panel 110.

As described above, in the display device 100 according to an embodiment, the delay time DT between the first data enable signal DE1 before the data processing operation is performed by the data processing blocks 170 and the second data enable signal DE2 after the data processing operation is performed may be obtained, the number of the subsequent pulses of the output data enable signal ODE which are to be output during the period from the one time point TP within the current frame period FP1 to the end time point of the current frame period FP1 may be determined, and the cycle or the period of the subsequent pulses of the output data enable signal ODE may be adjusted based on the delay time DT and the number of the subsequent pulses. Accordingly, the no-signal time NST in which no pulse of the output data enable signal ODE exists in the end portion of the current frame period FP1 may be removed, and the luminance step difference at the end time point of the current frame period FP1 may be reduced or prevented.

Figure 13:
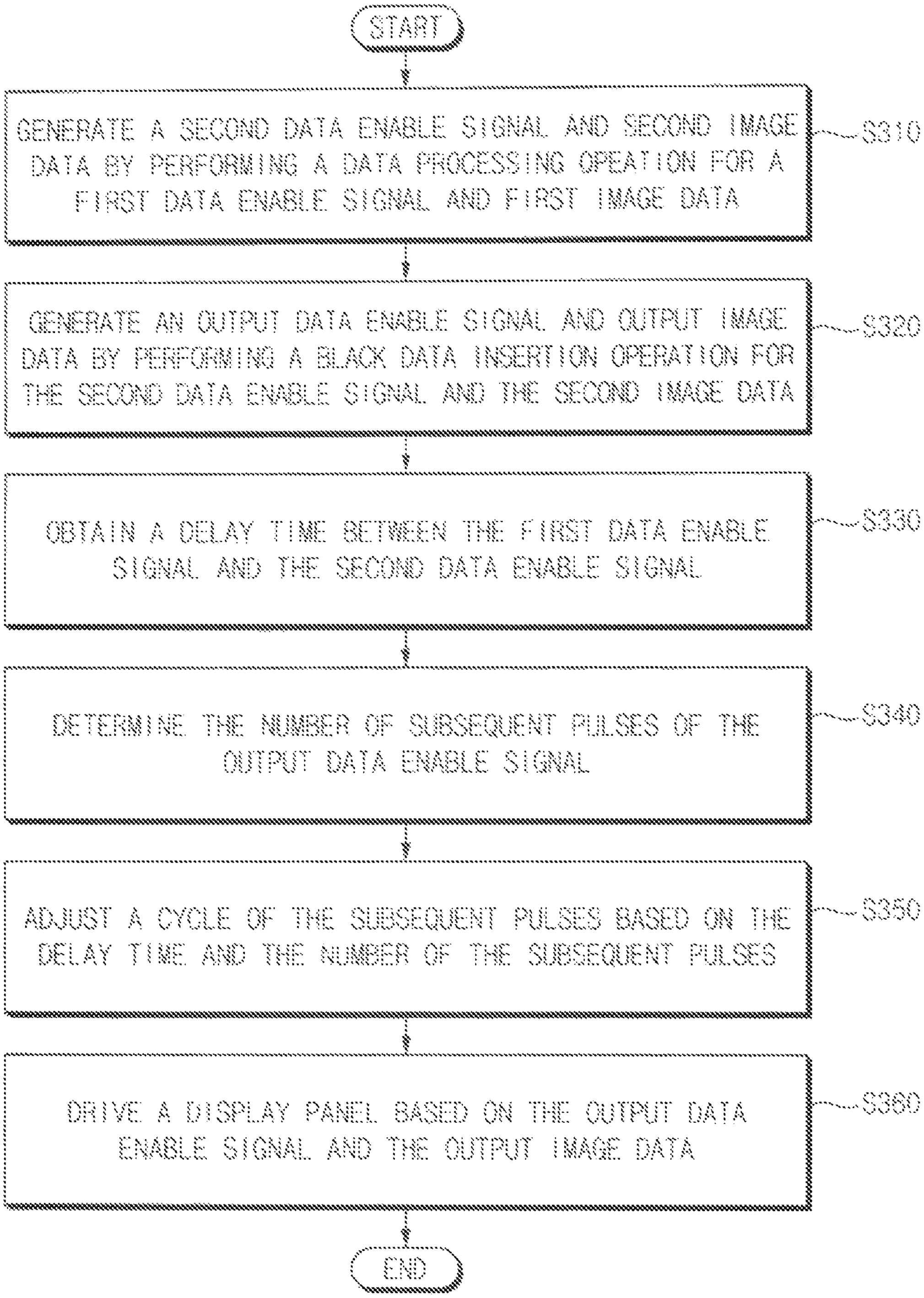
FIG. 13 is a flowchart diagram illustrating a method of operating a display device according to an embodiment.

FIG. 13 illustrates a method of operating a display device according to an embodiment.

Referring to FIGS. 1, 9 and 13, one or more data processing blocks 170 may generate a second data enable signal DE2 and second image data DAT2 by performing a data processing operation for a first data enable signal DE1 and first image data DAT1 (S310). In an embodiment, the second data enable signal DE2 may be delayed by a delay time corresponding to a sum of latencies of the one or more data processing blocks 170 with respect to the first data enable signal DE1.

A black data insertion block 180 may generate an output data enable signal ODE and output image data ODAT by performing a black data insertion operation for the second data enable signal DE2 and the second image data DAT2 (S320).

The black data insertion block 180 may obtain the delay time between the first data enable signal DE1 and the second data enable signal DE2 (S330), and may determine the number of subsequent pulses of the output data enable signal ODE which are to be output during a period from one time point within a frame period to an end time point of the frame period (S340). In an embodiment, the black data insertion block 180 may calculate the number of the subsequent pulses of the output data enable signal ODE in a current frame period by subtracting the number of previous pulses of the output data enable signal ODE which are output from a start time point of the current frame period to the one time point within the current frame period from the number of entire pulses of the output data enable signal ODE in a previous frame period.

The black data insertion block 180 may adjust a cycle or a period of the subsequent pulses of the output data enable signal ODE based on the delay time and the number of the subsequent pulses (S350). In an embodiment, the black data insertion block 180 may calculate an unadjusted output time from the one time point to an unadjusted end time point of the subsequent pulses by multiplying the number of the subsequent pulses by a cycle of each pulse of the second data enable signal DE2, may calculate a cycle adjustment coefficient by dividing the delay time by the unadjusted output time, and may increase the cycle of the subsequent pulses of the output data enable signal ODE by multiplying the cycle of the subsequent pulses by the cycle adjustment coefficient. Accordingly, the subsequent pulses of the output data enable signal ODE may be uniformly distributed during the period from the one time point to the end time point of the frame period FP, and no-signal time in an end portion of the frame period may be removed.

A data driver 150 may drive a display panel 110 based on the output data enable signal ODE and the output image data ODAT (S360). In the method of operating the display device 100 according to an embodiment, the no-signal time need not exist in the end portion of the frame period, and thus a luminance step difference caused by the no-signal time may be reduced or prevented.

Figure 14:
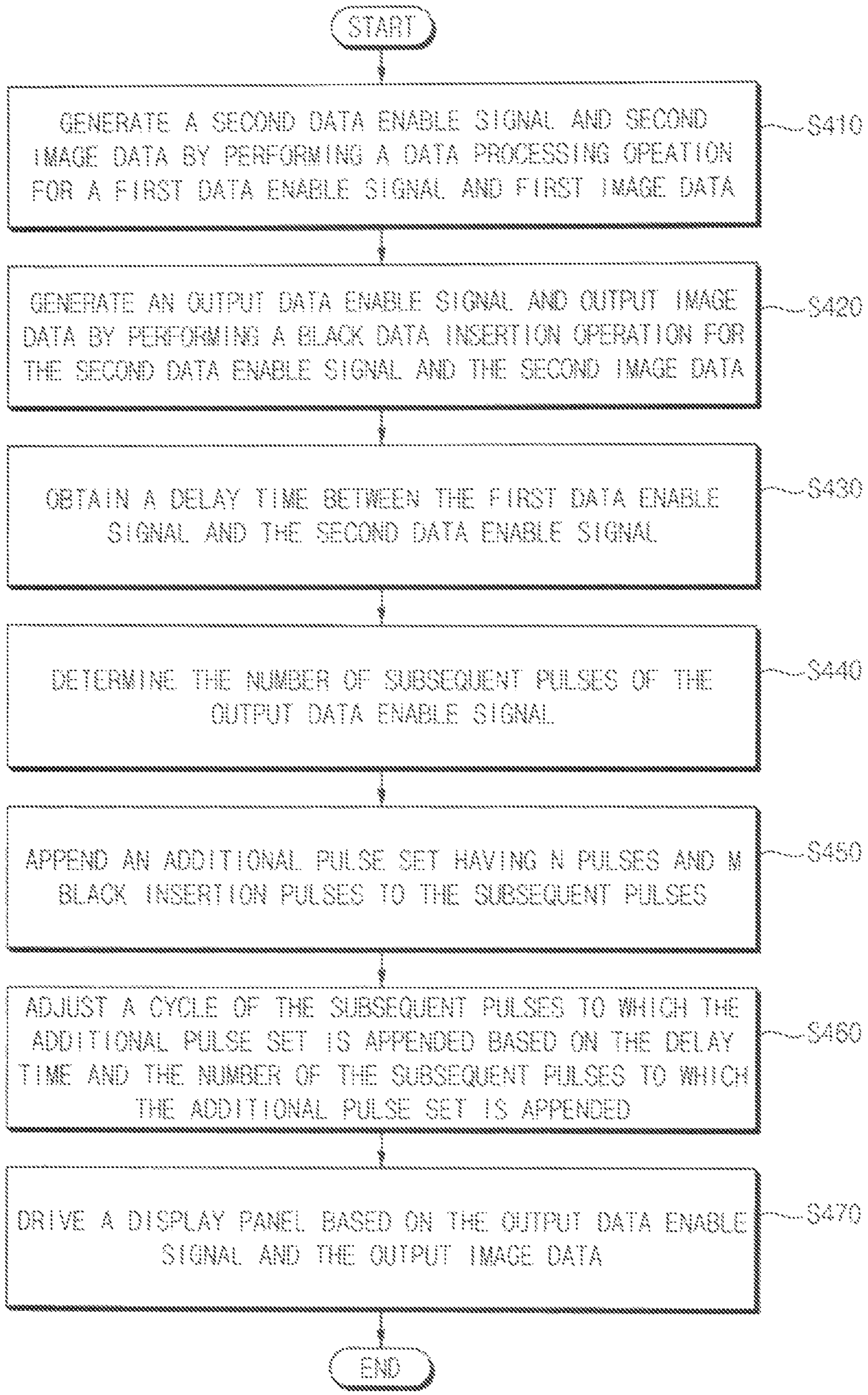
FIG. 14 is a flowchart diagram illustrating a method of operating a display device according to an embodiment.
Figure 15:
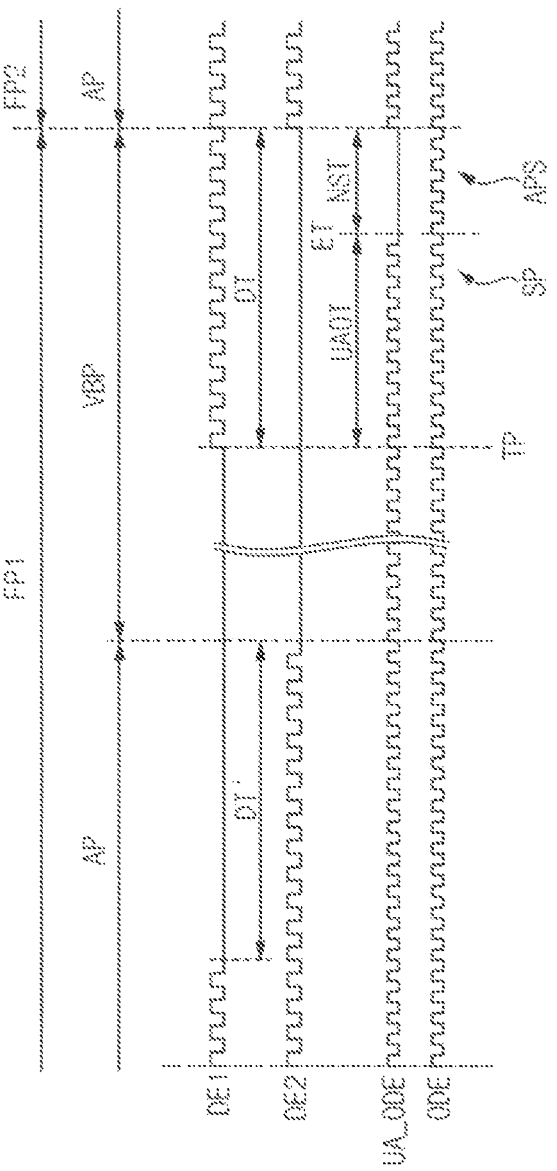
FIG. 15 is a timing diagram illustrating an example of a first data enable signal, a second data enable signal and an output data enable signal in a display device according to an embodiment.
Figure 16:
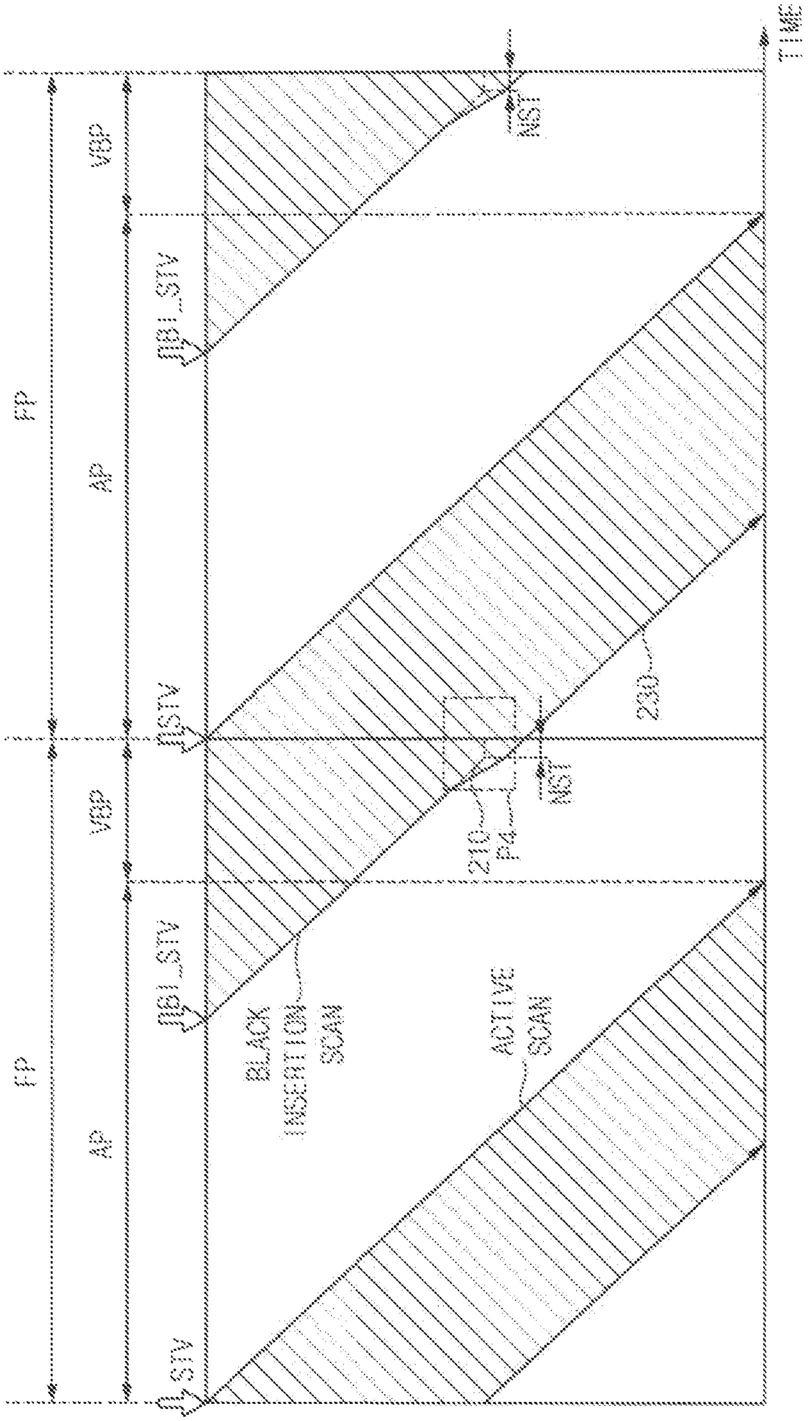
FIG. 16 is a hybrid diagram illustrating an example of a frame period in a display device according to an embodiment.
Figure 17:
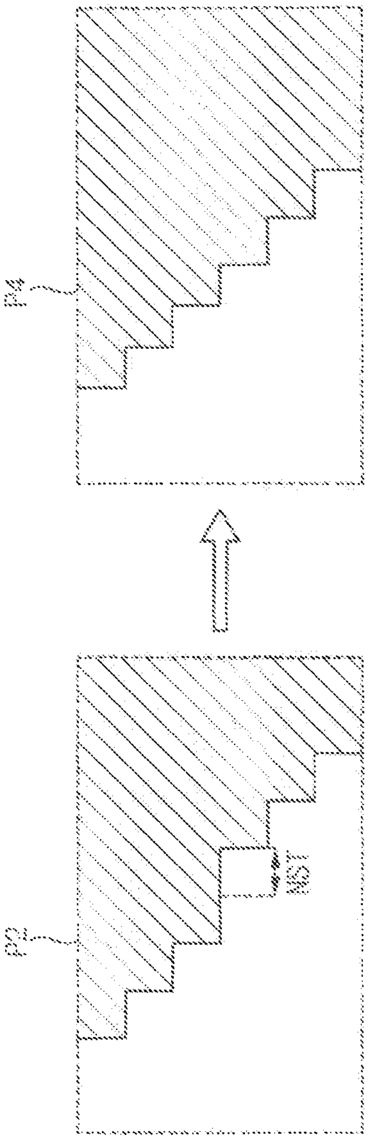
FIG. 17 is a hybrid diagram for describing an example of an operation of a display device according to an embodiment.

FIG. 14 illustrates a method of operating a display device according to an embodiment. FIG. 15 illustrates an example of a first data enable signal, a second data enable signal and an output data enable signal in a display device according to an embodiment. FIG. 16 illustrates an example of a frame period in a display device according to an embodiment. FIG. 17 is used for describing an example of an operation of a display device according to an embodiment.

Referring to FIGS. 1, 9 and 14, one or more data processing blocks 170 may generate a second data enable signal DE2 and second image data DAT2 by performing a data processing operation for a first data enable signal DE1 and first image data DAT1 (S410).

A black data insertion block 180 may generate an output data enable signal ODE and output image data ODAT by performing a black data insertion operation for the second data enable signal DE2 and the second image data DAT2 (S420).

The black data insertion block 180 may obtain the delay time between the first data enable signal DE1 and the second data enable signal DE2 (S430), and may determine the number of subsequent pulses of the output data enable signal ODE which are to be output during a period from one time point within a frame period to an end time point of the frame period (S440).

The black data insertion block 180 may append an additional pulse set, similar to a pulse set PS illustrated in FIG. 5, to the subsequent pulses (S450). For example, similarly to the pulse set PS illustrated in FIG. 5, the additional pulse set may have N pulses and M black insertion pulses, where N is an integer greater than zero, and M is an integer greater than zero. Further, the black data insertion block 180 may adjust a cycle or a period of the subsequent pulses to which the additional pulse set is appended based on the delay time and the number of the subsequent pulses to which the additional pulse set is appended (S460).

For example, as illustrated in FIG. 15, at one time point TO within a current frame period FP1, the black data insertion block 180 may append the additional pulse set APS to the subsequent pulses. Further, the black data insertion block 180 may adjust the cycle of the subsequent pulses SP to which the additional pulse set APS is appended such that the subsequent pulses SP to which the additional pulse set APS is appended are uniformly distributed during the period from the one time point TP to the end time point of the current frame period FP1, or during the delay time DT between the first data enable signal DE1 and the second data enable signal DE2. For example, a no-signal time NST in which an unadjusted output data enable signal UA_ODE has no pulse may be shorter than a time of the additional pulse set APS before the cycle adjustment is performed, and the cycle of the subsequent pulses SP to which the additional pulse set APS is appended may be decreased such that the subsequent pulses SP to which the additional pulse set APS is appended are uniformly distributed during the delay time DT. In this case, as illustrated as a graph 230 in FIG. 16, a black insertion scan operation need not be stopped, luminance of a display panel 110 may be gradually changed, and a luminance step difference caused by the no-signal time NST may be reduced or prevented in the display panel 110. Further, as illustrated in FIG. 17, in the method of operating the display device 100 according to an embodiment, unlike a second portion P2 of FIG. 2 in which the black insertion scan operation is stopped during the no-signal time NST, the no-signal time NST may be substantially removed as illustrated as a fourth portion P4 of FIG. 16. Accordingly, a sharp luminance change of the display panel 110 may be prevented, and the luminance step difference may be reduced or prevented in the display panel 110.

A data driver 150 may drive the display panel 110 based on the output data enable signal ODE and the output image data ODAT (S470). In the method of operating the display device 100 according to an embodiment, the no-signal time NST need not exist in the end portion of the frame period FP, and thus the luminance step difference caused by the no-signal time NST may be reduced or prevented.

Figure 18:
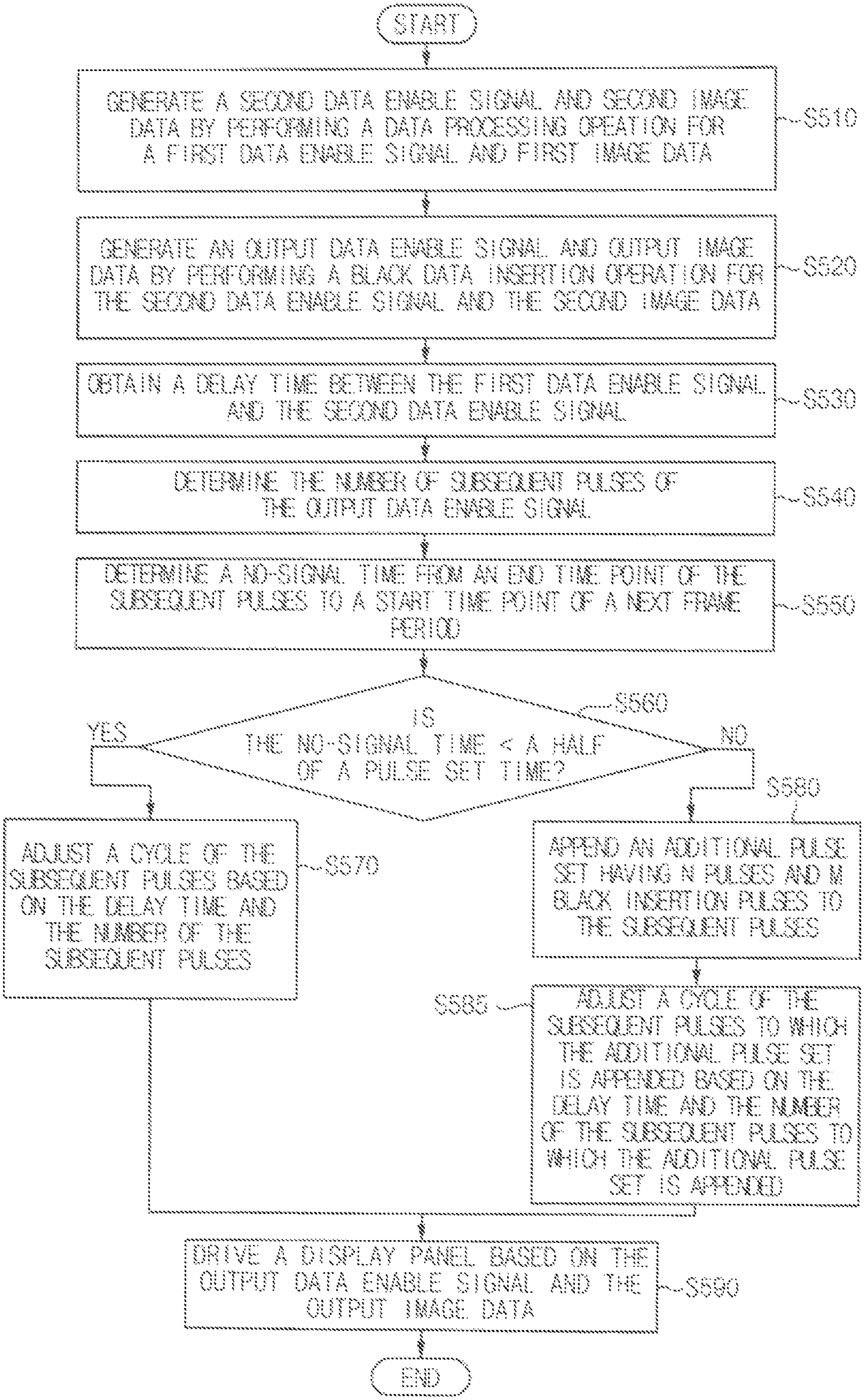
FIG. 18 is a flowchart diagram illustrating a method of operating a display device according to an embodiment.

FIG. 18 illustrates a method of operating a display device according to an embodiment.

Referring to FIGS. 1, 9 and 18, one or more data processing blocks 170 may generate a second data enable signal DE2 and second image data DAT2 by performing a data processing operation for a first data enable signal DE1 and first image data DAT1 (S510).

A black data insertion block 180 may generate an output data enable signal ODE and output image data ODAT by performing a black data insertion operation for the second data enable signal DE2 and the second image data DAT2 (S520).

The black data insertion block 180 may obtain the delay time between the first data enable signal DE1 and the second data enable signal DE2 (S530), and may determine the number of subsequent pulses of the output data enable signal ODE which are to be output during a period from one time point within a frame period to an end time point of the frame period (S540).

The black data insertion block 180 may determine a no-signal time, such as the no-signal time NST illustrated in FIG. 10 or FIG. 15, from an end time point of the subsequent pulses, such as an end time point ET of an unadjusted output time UAOT illustrated in FIG. 10 or FIG. 15, to a start time point of a next time period (S550), and may compare the no-signal time with a half of a pulse set time, such as a time of a pulse set PS illustrated in FIG. 5 (S560).

In a case where the no-signal time is less than the half of the pulse set time (S560: YES), as illustrated in FIG. 10, the black data insertion block 180 may adjust a cycle of the subsequent pulses such that the subsequent pulses are uniformly distributed during the period from the one time point TP to the end time point of the frame period FP1, or during the delay time DT between the first data enable signal DE1 and the second data enable signal DE2 (S570).

Alternatively, in a case where the no-signal time is greater than or equal to the half of the pulse set time (S560: NO), as illustrated in FIG. 15, the black data insertion block 180 may append an additional pulse set APS having N pulses and M black insertion pulses to the subsequent pulses SP (S580), and may adjust the cycle of the subsequent pulses SP to which the additional pulse set APS is appended such that the subsequent pulses SP to which the additional pulse set APS is appended are uniformly distributed during the period from the one time point TP to the end time point of the frame period FP1, or during the delay time DT between the first data enable signal DE1 and the second data enable signal DE2 (S585).

A data driver 150 may drive the display panel 110 based on the output data enable signal ODE and the output image data ODAT (S590). In the method of operating the display device 100 according to an embodiment, a no-signal time need not exist in the end portion of the frame period, and thus a luminance step difference caused by the no-signal time NST may be reduced or prevented.

Figure 19:
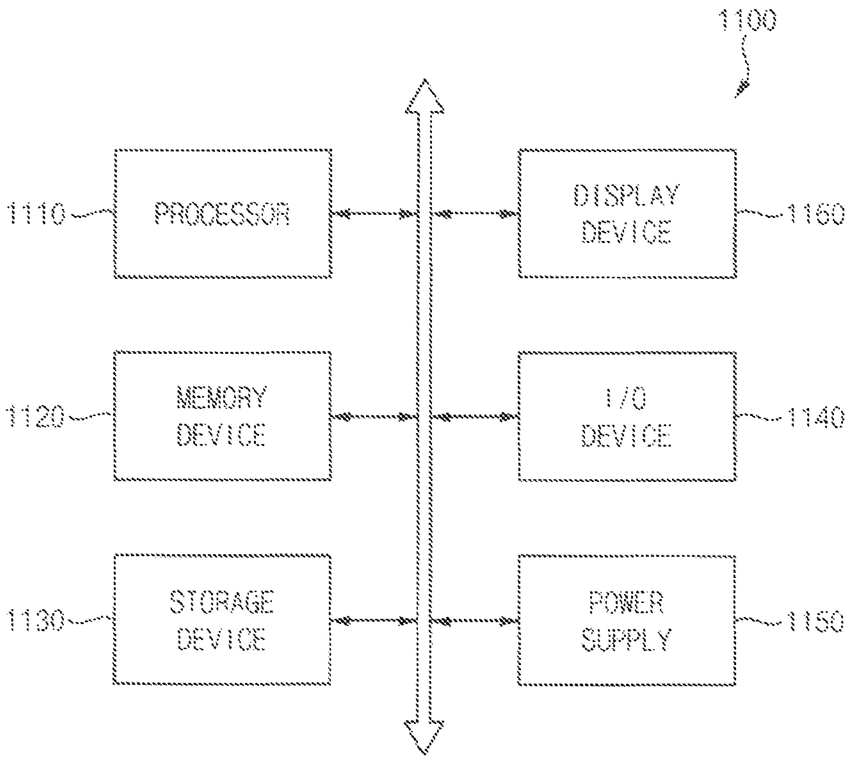
FIG. 19 is a block diagram illustrating an electronic device including a display device according to an embodiment.

FIG. 19 illustrates an electronic device including a display device according to an embodiment.

Referring to FIG. 19, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, or the like.

The processor 1110 may perform various computing functions or tasks. The processor 1110 may be an application processor (AP), a microprocessor, a central processing unit (CPU), or the like. The processor 1110 may be coupled to other components via an address bus, a control bus, a data bus, or the like. Further, in an embodiment, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like, and/or at least one volatile memory device such as a dynamic random access memory (DRAM) device, a static random access memory (SRAM) device, a mobile dynamic random access memory (mobile DRAM) device, or the like.

The storage device 1130 may be a solid state drive (SSD) device, a hard disk drive (HDD) device, a CD-ROM device, or the like. The I/O device 1140 may be an input device such as a keyboard, a keypad, a mouse, a touch screen, or the like, and an output device such as a printer, a speaker, or the like. The power supply 1150 may supply power for operations of the electronic device 1100. The display device 1160 may be coupled to other components through the buses or other communication links.

In the display device 1160, a delay time between a first data enable signal before a data processing operation is performed and a second data enable signal after the data processing operation is performed may be obtained, the number of subsequent pulses of an output data enable signal which are output during a period from one time point within a frame period to an end time point of the frame period may be determined, and a cycle or a period of the subsequent pulses of the output data enable signal may be adjusted based on the delay time and the number of the subsequent pulses. Accordingly, a no-signal time in which no pulse of the output data enable signal exists in an end portion of the frame period may be removed, and a luminance step difference caused by the no-signal time may be reduced or prevented.

An embodiment may be applied to any electronic device 1100 including the display device 1160. For example, an embodiment may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, or the like.

The foregoing is illustrative of embodiments and is not to be construed as limiting thereof. Although embodiments have been described in the context of non-limiting examples, those of ordinary skill in the pertinent art will readily appreciate that many modifications are possible in the described and other embodiments without materially departing from the scope and spirit of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as to other embodiments, are intended to be included within the scope of the appended claims.

What is claimed is:

1. A display device comprising:

a display panel including a plurality of pixels;

a controller configured to generate a second data enable signal and second image data by performing a data processing operation on first image data synchronized with a first data enable signal, and to generate an output data enable signal and output image data by performing a black data insertion operation for the second data enable signal and the second image data; and a data driver configured to provide data signals to the plurality of pixels based on the output data enable signal and the output image data, wherein the controller obtains a delay time between at least one of the first data enable signal and the second data enable signal or the first image data and the second image data, determines a number of subsequent pulses of the output data enable signal which are to be output during a period from one time point within a frame period to an end time point of the frame period, and adjusts a cycle of the subsequent pulses of the output data enable signal based on the delay time and the number of the subsequent pulses.

2. The display device of claim 1, wherein, to perform the black data insertion operation, the controller decreases a cycle of each pulse of the second data enable signal and a width of each line data of the second image data, appends M black insertion pulses to each N pulses of the second data enable signal to generate the output data enable signal in which a pulse set having the N pulses and the M black insertion pulses is repeated, and appends M black line data to each N line data of the second image data to generate the output image data in which a line data set having the N line data and the M black line data is repeated, where N is an integer greater than zero, and M is an integer greater than zero.

3. The display device of claim 2, wherein the controller adjusts the cycle of the subsequent pulses of the output data enable signal such that an end time point of the pulse set coincides with the end time point of the frame period.

4. The display device of claim 2, further comprising:

a scan driver configured to provide scan signals to the plurality of pixels, wherein, in an active period of the frame period, the scan driver sequentially provides the scan signals to N first rows of the plurality of pixels during a time corresponding to the N pulses of a first pulse set, and substantially simultaneously provides the scan signals to N second rows of the plurality of pixels during a time corresponding to the M black insertion pulses of the first pulse set, and wherein, in a vertical blank period of the frame period, the scan driver substantially simultaneously provides the scan signals to N third rows of the plurality of pixels during a time corresponding to the M black insertion pulses of a second pulse set.

5. The display device of claim 4, wherein the scan driver includes:

a plurality of active stages configured to sequentially provide the scan signals to the plurality of pixels on a row-by-row basis in the active period; and a plurality of black insertion stages configured to sequentially provide the scan signals to the plurality of pixels on a pixel row group-by-pixel row group basis in at least a portion of the active period and the vertical blank period, each pixel row group including N pixel rows, and wherein a number of the plurality of black insertion stages is less than a number of the plurality of active stages.

6. The display device of claim 1, wherein the controller adjusts the cycle of the subsequent pulses of the output data enable signal such that the subsequent pulses of the output data enable signal are uniformly distributed during the period from the one time point within the frame period to the end time point of the frame period.

7. The display device of claim 1, wherein the one time point within the frame period is a start time point of consecutive pulses of the first data enable signal for a next time period.

8. The display device of claim 1, wherein the controller includes:

one or more data processing blocks configured to receive the first data enable signal and the first image data, and to output the second data enable signal and the second image data by performing the data processing operation; and a black data insertion block configured to receive the first data enable signal, to receive the second data enable signal and the second image data from the one or more data processing blocks, to output the output data enable signal and the output image data by performing the black data insertion operation, and to adjust the cycle of the subsequent pulses of the output data enable signal.

9. The display device of claim 8, wherein the delay time between the first data enable signal and the second data enable signal is determined as a sum of latencies of the one or more data processing blocks.

10. The display device of claim 8, wherein the black data insertion block obtains the delay time between the first data enable signal and the second data enable signal, determines the number of the subsequent pulses of the output data enable signal in a current frame period based on a number of entire pulses of the output data enable signal in a previous frame period and a number of previous pulses of the output data enable signal during a period from a start time period of the current frame period to the one time point within the current frame period, and increases the cycle of the subsequent pulses of the output data enable signal based on the delay time and the number of the subsequent pulses.

11. The display device of claim 10, wherein the black data insertion block uses a predetermined time corresponding to a sum of latencies of the one or more data processing blocks as the delay time between the first data enable signal and the second data enable signal.

12. The display device of claim 10, wherein the black data insertion block obtains the delay time between the first data enable signal and the second data enable signal by counting a time from an end time point of consecutive pulses of the first data enable signal to an end time point of consecutive pulses of the second data enable signal.

13. The display device of claim 10, wherein the black data insertion block obtains the delay time between the first data enable signal and the second data enable signal by counting a time from a start time point of consecutive pulses of the first data enable signal to a start time point of consecutive pulses of the second data enable signal.

14. The display device of claim 10, wherein the black data insertion block calculates the number of the subsequent pulses of the output data enable signal in the current frame period by subtracting the number of the previous pulses in the current frame period from the number of the entire pulses in the previous frame period.

15. The display device of claim 10, wherein the black data insertion block calculates an unadjusted output time from the one time point to an unadjusted end time point of the subsequent pulses by multiplying the number of the subsequent pulses by a cycle of each pulse of the second data enable signal, calculates a cycle adjustment coefficient by dividing the delay time by the unadjusted output time, and increases the cycle of the subsequent pulses of the output data enable signal by multiplying the cycle of the subsequent pulses by the cycle adjustment coefficient.

16. The display device of claim 1, wherein the controller appends an additional pulse set having N pulses and M black insertion pulses to the subsequent pulses, and adjusts the cycle of the subsequent pulses to which the additional pulse set is appended such that the subsequent pulses to which the additional pulse set is appended are uniformly distributed during the period from the one time point to the end time point of the frame period, where N is an integer greater than zero, and M is an integer greater than zero.

17. The display device of claim 1, wherein the controller determines a no-signal time from an end time point of the subsequent pulses to a start time point of a next time period, and compares the no-signal time with a half of a pulse set time, wherein, in a case where the no-signal time is less than the half of the pulse set time, the controller adjusts the cycle of the subsequent pulses such that the subsequent pulses are uniformly distributed during the period from the one time point to the end time point of the frame period, and wherein, in a case where the no-signal time is greater than or equal to the half of the pulse set time, the controller appends an additional pulse set having N pulses and M black insertion pulses to the subsequent pulses, and adjusts the cycle of the subsequent pulses to which the additional pulse set is appended such that the subsequent pulses to which the additional pulse set is appended are uniformly distributed during the period from the one time point to the end time point of the frame period, where N is an integer greater than zero, and M is an integer greater than zero.

18. A method of operating a display device, the method comprising:

generating a second data enable signal and second image data by performing a data processing operation on first image data synchronized with a first data enable signal;

generating an output data enable signal and output image data by performing a black data insertion operation for the second data enable signal and the second image data;

obtaining a delay time between at least one of the first data enable signal and the second data enable signal or the first image data and the second image data;

determining a number of subsequent pulses of the output data enable signal which are to be output during a period from one time point within a frame period to an end time point of the frame period;

adjusting a cycle of the subsequent pulses of the output data enable signal based on the delay time and the number of the subsequent pulses; and driving a display panel based on the output data enable signal and the output image data.

19. The method of claim 18, wherein adjusting the cycle of the subsequent pulses of the output data enable signal includes:

determining a no-signal time from an end time point of the subsequent pulses to a start time point of a next time period;

comparing the no-signal time with a half of a pulse set time;

adjusting the cycle of the subsequent pulses such that the subsequent pulses are uniformly distributed during the period from the one time point to the end time point of the frame period in a case where the no-signal time is less than the half of the pulse set time;

appending an additional pulse set having N pulses and M black insertion pulses to the subsequent pulses in a case where the no-signal time is greater than or equal to the half of the pulse set time, where N is an integer greater than zero, and M is an integer greater than zero; and adjusting the cycle of the subsequent pulses to which the additional pulse set is appended such that the subsequent pulses to which the additional pulse set is appended are uniformly distributed during the period from the one time point to the end time point of the frame period.

20. A display driver configured to drive a display panel including a plurality of pixels, the display driver comprising:

a controller configured to generate a second data enable signal and second image data by performing a data processing operation on first image data synchronized with a first data enable signal, and to generate an output data enable signal and output image data by performing a black data insertion operation for the second data enable signal and the second image data;

a scan driver including a plurality of active stages and at least one black insertion stage responsive to the controller, the plurality of active stages configured to receive at least one of a scan start signal or a scan clock signal from the controller, and the at least one black insertion stage configured to receive at least one of a black insertion start signal or a black insertion clock signal from the controller, the scan driver configured to provide scan signals to the plurality of pixels based on the at least one of the scan start signal or the scan clock signal and the at least one of the black insertion start signal or the black insertion clock signal; and a data driver configured to provide data signals to the plurality of pixels based on the output data enable signal and the output image data, wherein the controller obtains a delay time between at least one of the first data enable signal and the second data enable signal or the first image data and the second image data, determines a number of subsequent pulses of the output data enable signal which are to be output during a period from one time point within a frame period to an end time point of the frame period, and adjusts a cycle of the subsequent pulses of the output data enable signal based on the delay time and the number of the subsequent pulses.

* * * * *